US012640374B2

(12) United States Patent
Ha et al.

(10) Patent No.: US 12,640,374 B2
(45) Date of Patent: May 26, 2026

(54) ELECTRODE ASSEMBLY AND SECONDARY BATTERY COMPRISING ELECTRODE ASSEMBLY

(71) Applicant: Samsung SDI Co., Ltd., Yongin-si (KR)

(72) Inventors: Jaehwan Ha, Yongin-si (KR); Taejoong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 56 days.

(21) Appl. No.: 18/484,883

(22) Filed: Oct. 11, 2023

(65) Prior Publication Data

US 2024/0258530 A1      Aug. 1, 2024

(30) Foreign Application Priority Data

Jan. 30, 2023      (KR) ........................ 10-2023-0011860

(51) Int. Cl.
H01M 4/66 (2006.01)
H01M 10/04 (2006.01)
(Continued)

(52) U.S. Cl.
CPC ........... H01M 4/664 (2013.01); H01M 4/667 (2013.01); H01M 10/0431 (2013.01);
(Continued)

(58) Field of Classification Search
CPC .. H01M 4/664; H01M 50/586; H01M 50/105; H01M 50/595; H01M 4/667
See application file for complete search history.

(56) References Cited

U.S. PATENT DOCUMENTS

| | | | |
|---|---|---|---|
| 11,444,333 B2 | 9/2022 | Zheng et al. | |
| 2009/0176151 A1* | 7/2009 | Kim ...................... | H01M 4/587 429/129 |

(Continued)

FOREIGN PATENT DOCUMENTS

| | | |
|---|---|---|
| CN | 202363549 U | 8/2012 |
| CN | 208045607 U | 11/2018 |

(Continued)

OTHER PUBLICATIONS

Extended European Search Report issued by the European Patent Office for corresponding Application No. 24154190.3, mailed on Jun. 25, 2024, 8 pages.

(Continued)

*Primary Examiner* — Olatunji A Godo
(74) *Attorney, Agent, or Firm* — Womble Bond Dickinson (US) LLP

(57) ABSTRACT

An electrode accommodated in an exterior material includes a positive electrode, the positive electrode including a positive electrode substrate and a positive active material layer disposed on both sides of the positive electrode substrate, a negative electrode, and a separator between the positive electrode and the negative electrode, wherein the positive electrode is at an outermost side of the electrode assembly, the positive electrode substrate includes a first surface and a second surface opposite to the first surface, the first surface and the second surface include, respectively, a first or second coated portion on which the positive active material layer is located and a first or second uncoated portion free from the positive active material layer, a first ceramic coating layer is on the first uncoated portion and a second ceramic coating layer is on the second uncoated portion, and the first ceramic coating layer directly faces the exterior material.

20 Claims, 9 Drawing Sheets

(51) Int. Cl.
H01M 50/105 (2021.01)
H01M 50/586 (2021.01)
H01M 50/595 (2021.01)
*H01M 4/02* (2006.01)

(52) U.S. Cl.
CPC ....... H01M 50/105 (2021.01); H01M 50/586 (2021.01); H01M 50/595 (2021.01); *H01M 2004/021* (2013.01); *H01M 2004/028* (2013.01)

(56) References Cited

U.S. PATENT DOCUMENTS

| | | | |
|---|---|---|---|
| 2009/0181300 A1* | 7/2009 | Kim ...................... | H01M 4/139 |
| | | | 429/185 |
| 2017/0179461 A1* | 6/2017 | Moon ................... | H01M 4/664 |
| 2020/0144674 A1 | 5/2020 | Zheng et al. | |
| 2022/0376265 A1 | 11/2022 | Zhang et al. | |

FOREIGN PATENT DOCUMENTS

| | | | | |
|---|---|---|---|---|
| EP | 2 139 057 B1 | | 5/2019 | |
| EP | 3 648 224 A1 | | 5/2020 | |
| JP | 2013143225 A | * | 7/2013 | ............ H01M 10/04 |
| KR | 2012034567 A | * | 4/2012 | ........ H01M 10/0436 |
| KR | 2017074584 A | * | 6/2017 | ........ H01M 10/0431 |
| KR | 2018097084 A | * | 8/2018 | ............ H01M 10/04 |

OTHER PUBLICATIONS

Office Action issued Dec. 4, 2025 by EPO for corresponding European Patent Application No. 24 154 190.3, 6 pages.
Notice of Allowance issued by KIPO on Oct. 14, 2025 for corresponding Korean Patent Application No. 10-2023-0011860, 2 pages.

\* cited by examiner

ELECTRODE ASSEMBLY AND SECONDARY BATTERY COMPRISING ELECTRODE ASSEMBLY

CROSS-REFERENCE TO RELATED APPLICATION

This application claims priority to and the benefit of Korean Patent Application No. 10-2023-0011860, filed on Jan. 30, 2023, in the Korean Intellectual Property Office, the entire content of which is hereby incorporated by reference.

BACKGROUND

1. Field

One or more embodiments relate to an electrode assembly and a secondary battery comprising the electrode assembly.

2. Description of the Related Art

To meet miniaturization and high performance designs of various devices, lithium batteries having high energy densities are becoming important. That is, high-capacity lithium batteries are becoming important.

To realize lithium batteries suitable for this purpose, batteries with high loading and improved safety are being studied.

In batteries with high loading, structural safety of the batteries can deteriorate due to short circuits caused by volume changes in an electrode assembly, short circuits caused by an external impact, or the like.

Therefore, there is a need or desire to develop lithium batteries with high capacity and improved structural safety.

SUMMARY

Aspects of one or more embodiments of the present disclosure are directed toward an electrode assembly having improved structural safety by introducing insulating layers on both surfaces of an uncoated portion of a positive electrode.

Aspects of one or more embodiments of the present disclosure are directed toward a secondary battery including the electrode assembly.

Additional aspects will be set forth in part in the description which follows and, in part, will be apparent from the description, or may be learned by practice of the presented embodiments of the disclosure.

According to one or more embodiments of the present disclosure, an electrode assembly accommodated in an exterior material includes a positive electrode including a positive electrode substrate and a positive active material layer on both sides of the positive electrode substrate, a negative electrode, and a separator between the positive electrode and the negative electrode, wherein the positive electrode is at (e.g., located at) the outermost side of the electrode assembly, the positive electrode substrate includes a first surface and a second surface opposite to the first surface, the first surface includes a first coated portion on which the positive active material layer is located and a first uncoated portion free from the positive active material layer, the second surface has a second coated portion on which the positive active material layer is located and a second uncoated portion free from the positive active material layer, a first ceramic coating layer is on the first uncoated portion and a second ceramic coating layer is disposed on the second uncoated portion, and the first ceramic coating layer directly faces the exterior material.

According to one or more embodiments of the present disclosure, a secondary battery includes an exterior material; and the above-described electrode assembly accommodated in the exterior material.

BRIEF DESCRIPTION OF THE DRAWINGS

The above and other aspects, features, and/or principles of certain embodiments of the disclosure will be more apparent from the following description taken in conjunction with the accompanying drawings, in which.

DETAILED DESCRIPTION

Figure 1:
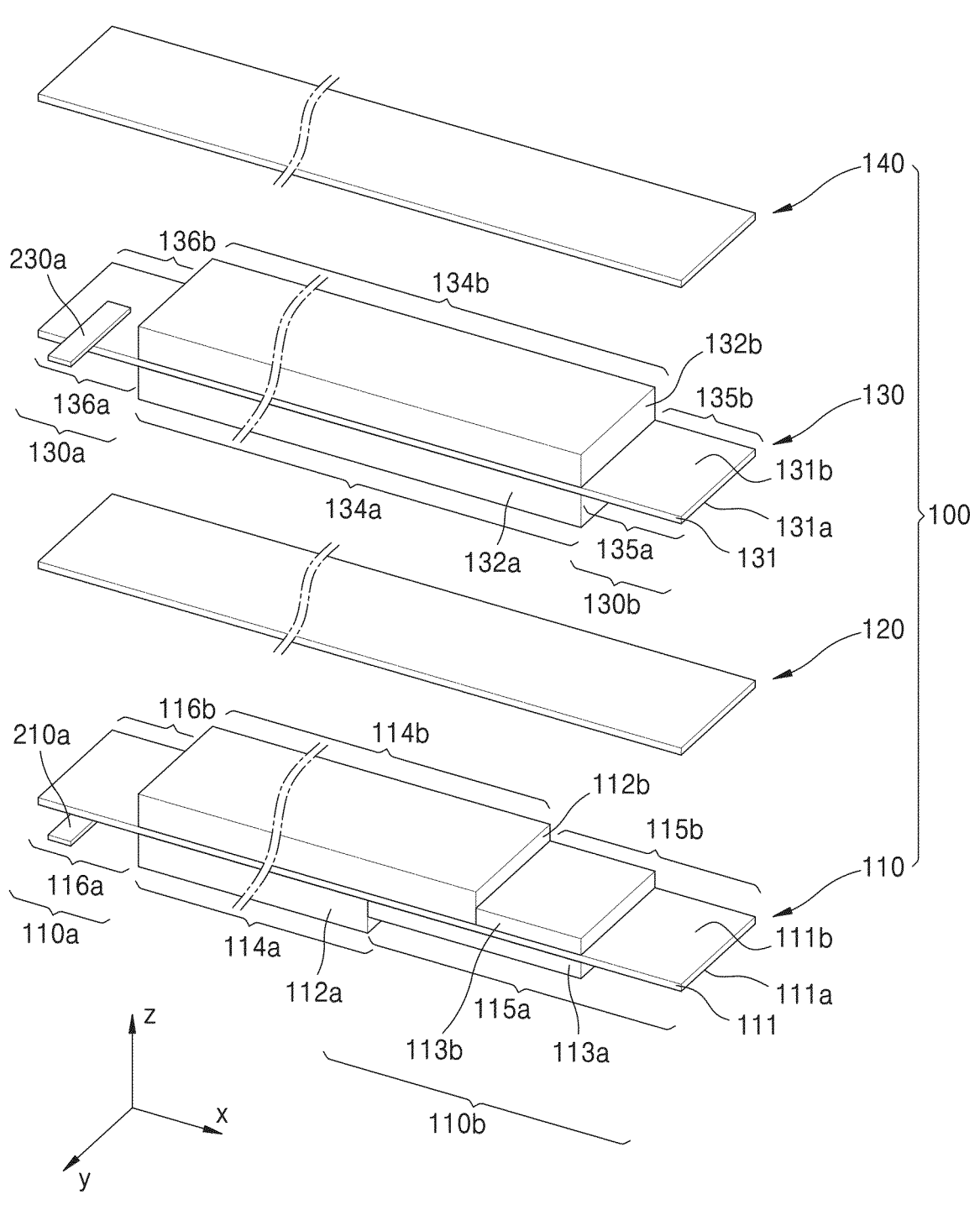
FIG. 1 is an exploded perspective view of an electrode assembly before being wound, according to one or more embodiments of the present disclosure.

Reference will now be made in detail to embodiments, examples of which are illustrated in the accompanying drawings, wherein like reference numerals refer to like elements throughout, and thus, duplicative descriptions thereof may not be provided. The present embodiments may have different forms and should not be construed as being limited to the descriptions set forth herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Accordingly, the embodiments are merely described below, by referring to the figures, to explain aspects of the present description. As used herein, the term "and/or" includes any and all combinations of one or more of the associated listed items. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and/or c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

The present disclosure described below allows for various changes and numerous embodiments, particular embodiments will be illustrated in the drawings and described in detail in the written description. However, this is not intended to limit the disclosure to particular modes of practice, and it is to be appreciated that all modifications, equivalents, and substitutes that do not depart from the spirit and technical scope of the disclosure are encompassed in the disclosure.

The terms used herein are merely used to describe particular embodiments and are not intended to limit the present inventive concept.

As used herein, the singular forms "a," "an" and "the" are intended to include the plural forms as well, unless the context clearly indicates otherwise.

In the present specification, it is to be understood that the terms such as "comprising," "including" or "having," etc., are intended to specify the presence of the stated features, numbers, operations, elements, parts, components, or combinations thereof disclosed in the specification, but are not intended to preclude the possibility of one or more other features, numbers, operations, elements, parts, components, or combinations thereof. As used herein, the "/" may be interpreted as either "and" or "or" depending on the context.

In the drawings, thicknesses of various layers and regions may be enlarged or reduced for clarity. Throughout the specification, like reference numerals denote like elements.

Throughout the specification, it will be understood that when one element such as layer, film, region, or plate, is referred to as being "on" or "connected to" another element, it may be directly on the other element, or intervening elements may also be present therebetween. In addition, it will also be understood that when an element or layer is referred to as being "between" two elements or layers, it can be the only element or layer between the two elements or layers, or one or more intervening elements or layers may also be present.

In the present disclosure, spatially related terms, such as "beneath," "below," "lower," "above," "upper" and the like, may be used herein for ease of explanation to describe one element or feature's relationship to another element(s) or feature(s) as illustrated in the drawings. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Although the terms "first," "second," etc. may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the present specification, when particles are spherical, "diameter" or "size" indicates an average particle diameter, and when the particles are non-spherical, the diameter" or "size" indicates a major axis length. The size of the particles may be measured utilizing a scanning electron microscope or a particle size analyzer. As the particle size analyzer, for example, a LA-920 from Horiba Instruments, Inc. or similar may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

Hereinafter, an electrode assembly and a secondary battery including the same according to embodiments will be described in detail.

An electrode assembly according to one or more embodiments includes a positive electrode, a negative electrode, and a separator disposed between the positive electrode and the negative electrode. For example, the positive electrode, the separator, and the negative electrode may be wound in a jelly-roll structure.

Figure 2:
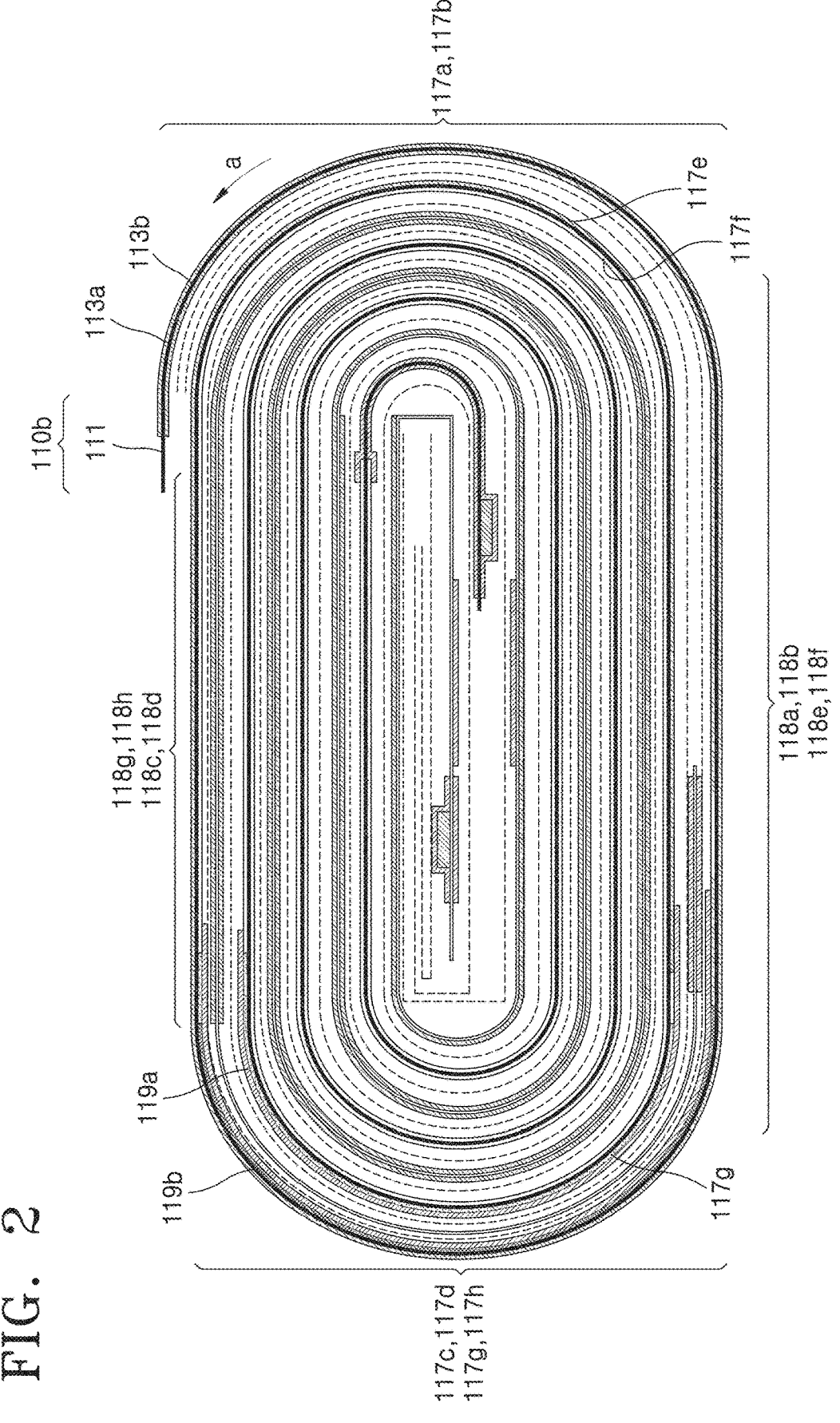
FIG. 2 is a cross-sectional view of a wound electrode assembly according to one or more embodiments of the present disclosure.

Referring to FIGS. 1 to 9, an electrode assembly 100 may have a structure in which a positive electrode 110, a separator 120, a negative electrode 130 and a separator 140 are sequentially stacked in a vertical direction as shown in FIG. 1 and rolled in a jelly-roll form from a winding start point (left end in FIG. 1) to a winding end point (right end in FIG. 1). For example, the wound electrode assembly 100 has a cross-sectional structure as shown in FIG. 2.

Electrode Assembly

Positive Electrode

FIG. 1 is an exploded perspective view of an electrode assembly before being wound, according to one or more embodiments of the present disclosure.

FIG. 2 is a cross-sectional view of a wound electrode assembly according to one or more embodiments of the present disclosure.

The positive electrode 110 is located in an outermost area of the wound electrode assembly 100. An outermost surface of the wound electrode assembly 100 is covered with the positive electrode 110. The electrode assembly 100 is accommodated in an exterior material.

The positive electrode 110 includes a positive electrode substrate 111 and positive active material layers 112a and 112b disposed on both sides of the positive electrode substrate 111. The positive electrode substrate 111 includes a first surface 111a and a second surface 111b opposite to the first surface 111a.

The first surface 111a of the positive electrode substrate 111 includes a first coated portion 114a at (in) which the positive active material layer 112a is located and a first uncoated portion 115a located at (in) a winding end portion 110b and free from the positive active material layer 112a. The second surface 111b of the positive electrode substrate includes a second coated portion 114b at (in) which the positive active material layer 112b is located and a free second uncoated portion 115b located at (in) the winding end portion 110b and free from the positive active material layer 112*b*. The first surface 111*a* of the positive electrode substrate includes a first ceramic coating layer 113*a* located at (in) the first uncoated portion 115*a*, and the second surface 111*b* of the positive electrode substrate includes a second ceramic coating layer 113*b* located at (in) the second uncoated portion 115*b*. The first ceramic coating layer 113*a* located on the outermost surface of the wound electrode assembly 100 directly faces an exterior material.

By locating the first ceramic coating layer 113*a* in the first uncoated portion 115*a* of the positive electrode substrate 111 and locating the second ceramic coating layer 113*b* in the second uncoated portion 115*b* of the positive electrode substrate 111, both surfaces 115*a* and 115*b* of the uncoated portion are coated with the ceramic coating layer. Therefore, a short circuit caused by contact between the positive electrode substrate 111 and a negative electrode substrate 131 or a negative active material layer 132*a* or 132*b* due to volume change, growth of dendrites, and/or the like occurring during charging and discharging processes of a lithium battery may be effectively prevented or substantially prevented. In addition, because both the first uncoated portion 115*a* and the second uncoated portion 115*b* are covered with the ceramic coating layer, mechanical strength of the uncoated portion increases and defects such as curling and bending occurring in the uncoated portion during a process of winding the electrode assembly 100 may be prevented or substantially prevented.

The first ceramic coating layer 113*a* may cover 50% or more, 60% or more, 70% or more, 80% or more, 90% or more, or 95% or more of a total area of the first uncoated portion 115*a*. The first ceramic coating layer 113*a* may cover 50% to 100%, 60% to 100%, 70% to 100%, 80% to 100%, 90% to 100% or 95% to 100% of the total area of the first uncoated portion 115*a*. The second ceramic coating layer 113*b* may cover 50% or more, 60% or more, 70% or more, 80% or more, 90% or more, or 95% or more of a total area of the second uncoated portion 115*b*. The second ceramic coating layer 113*b* may cover 50% to 100%, 60% to 100%, 70% to 100%, 80% to 100%, 90% to 100% or 95% to 100% of the total area of the second uncoated portion 115*b*.

The first uncoated portion 115*a* and the second uncoated portion 115*b* included in the positive electrode 110 each independently include curved portions and straight portions alternately arranged when wound, as shown in, for example, FIG. 2. In the positive electrode 110 located in the outermost area of the electrode assembly 100, the curved portions and the straight portions are alternately arranged from the winding end portion 110*b* in a direction opposite to a winding direction (opposite to direction a). The first uncoated portion 115*a* includes a first curved portion 117*a* and a first straight portion 118*a*, and the first ceramic coating layer 113*a* is located in the first curved portion 117*a* and the first straight portion 118*a*. The second uncoated portion 115*b* includes a second curved portion 117*b* opposite to the first curved portion 117*a* and a second straight portion 118*b* opposite to the first straight portion 118*a*, and the second ceramic coating layer 113*b* is located in the second curved portion 117*b* and the second straight portion 118*b*. By locating the first ceramic coating layer 113*a* in the first curved portion 117*a* and the first straight portion 118*a* and locating the second ceramic coating layer 113*b* in the second curved portion 117*b* and the second straight portion 118*b*, deterioration of a lithium battery caused by a short circuit of the positive electrode substrate 111 may be effectively prevented Or substantially prevented.

A length of the first ceramic coating layer 113*a* arranged in a direction opposite to the winding direction of the electrode assembly 100 may be greater than that of the second ceramic coating layer 113*b*. For example, the first uncoated portion 115*a* further includes a third curved portion 117*c* and a third straight portion 118*c*, and the first ceramic coating layer 113*a* is located in the third curved portion 117*c* and the third straight portion 118*c*. Because the length of the first ceramic coating layer 113*a* is greater than that of the second ceramic coating layer 113*b*, the first ceramic coating layer 113*a* may be wound on the outermost surface of the electrode assembly 100 one or more times. Therefore, a short circuit of the positive electrode substrate 111 caused by an external factor such as external impact may be prevented or substantially prevented, and thus safety of the electrode assembly 100 may further be improved.

The first uncoated portion 115*a* may further include a fifth curved portion 117*e* extending from the third straight portion 118*c*. The first uncoated portion 115*a* may include the first curved portion 117*a* and the fifth curved portion 117*e*, the fifth curved portion 117*e* is arranged adjacent to an inner side of the first curved portion 117*a*, and the negative electrode 130 may be absent between the first curved portion 117*a* and the fifth curved portion 117*e*. Because the negative electrode 130 is absent between the first curved portion 117*a* and the fifth curved portion 117*e*, possibility of a short circuit caused by contact between the negative electrode 130 and the positive electrode 110 at one side surface of the electrode assembly 100 may be prevented or substantially prevented. Therefore, safety of the electrode assembly 100 may be improved.

A thickness of the first ceramic coating layer 113*a* may be smaller than that of the positive active material layer 112*a*. The thickness of the first ceramic coating layer 113*a* may be, for example, 90% or less of the thickness of the positive active material layer 112*a*. The thickness of the first ceramic coating layer 113*a* may be from 10% to 90%, from 20% to 90%, from 30% to 90%, or from 40% to 90% of that of the positive active material layer 112*a*. A thickness of the second ceramic coating layer 113*b* may be smaller than that of the positive active material layer 112*b*. The thickness of the second ceramic coating layer 113*b* may be, for example, 90% or less of the thickness of the positive active material layer 112*b*. The thickness of the second ceramic coating layer 113*b* may be from 10% to 90%, from 20% to 90%, from 30% to 90%, or from 40% to 90% of that of the positive active material layer 112*b*. Because the thicknesses of the first ceramic coating layer 113*a* and the second ceramic coating layer 113*b* are smaller than those of the positive active material layers 112*a* and 112*b*, possibility of a short circuit caused by an external impact, for example, by bending the electrode assembly 100, may be effectively prevented or substantially prevented. Therefore, safety of the electrode assembly 100 may be improved. Because the thicknesses of the first ceramic coating layer 113*a* and the second ceramic coating layer 113*b* are smaller than those of the positive active material layers 112*a* and 112*b*, a step difference between the first coated portion 114*a* and the first uncoated portion 115*a* may be effectively reduced to prevent or reduce cracks of the positive electrode substrate 111 occurring during a winding process.

The first ceramic coating layer 113*a* may be in contact with a side surface of the positive active material layer 112*a* and may not be in contact with a top surface of the positive active material layer 112*a*. For example, the first ceramic coating layer 113*a* may be in contact with the side surface of the positive active material layer 112*a* without extending onto the top surface of the positive active material layer 112*a*. Because the first ceramic coating layer 113*a* is in contact with the side surface of the positive active material layer 112a without extending onto the top surface of the positive active material layer 112a, cracks of the positive electrode 110 occurring due to overlapping of the first ceramic coating layer 113a and the positive active material layer 112a may be prevented or reduced.

A thickness of the first ceramic coating layer 113a may be different from that of the second ceramic coating layer 113b. The thickness of the first ceramic coating layer 113a may be, for example, greater than that of the second ceramic coating layer 113b. By designing the thickness of the first ceramic coating layer 113a to be greater than that of the second ceramic coating layer 113b, possibility of a short circuit caused by an external impact may be more effectively prevented or substantially prevented. By designing the thickness of the first ceramic coating layer 113a arranged to face the outer surface of the electrode assembly 100 to be greater than that of the second ceramic coating layer 113b, improved safety against an external impact such as a nail penetration test may be provided. The thicknesses of the first ceramic coating layer 113a and the second ceramic coating layer 113b may be each independently, for example, from 1 $\mu$m to 30 $\mu$m, from 1 $\mu$m to 25 $\mu$m, from 1 $\mu$m to 20 $\mu$m, from 1 $\mu$m to 15 $\mu$m, from 1 $\mu$m to 10 $\mu$m, or from 1 $\mu$m to 5 $\mu$m.

A thermal conductivity of the first ceramic coating layer 113a may be different from that of the second ceramic coating layer 113b. The thermal conductivity of the first ceramic coating layer 113a may be, for example, greater than that of the second ceramic coating layer 113b. By designing the thermal conductivity of the first ceramic coating layer 113a, for example, to be greater than that of the second ceramic coating layer 113b, heat generated during charging and discharging processes may be effectively dissipated out of the electrode assembly 100 through the outermost surface of the electrode assembly 100.

The first ceramic coating layer 113a may include first ceramic particles, and the second ceramic coating layer 113b may include second ceramic particles. The first ceramic particles and the second ceramic particles may be each independently particles of $SiO_2$, Boehmite, $BaTiO_3$, $Pb(Zr, Ti)O_3$ (PZT), $Pb_{1-x}La_xZr_{1-y}Ti_yO_3$ (PLZT, where $0<x<1$ and $0<y<1$), $Pb(Mg_{1/3}Nb_{2/3})O_3$—$PbTiO_3$ (PMN-PT), $HfO_2$, $SrTiO_3$, $SnO_2$, $CeO_2$, $MgO$, $NiO$, $CaO$, $ZnO$, $ZrO_2$, $Y_2O_3$, $Al_2O_3$, $SiC$, $TiO_2$, $PbO$, $Bi_2O_3$, $MoOs$, $V_2O_5$, $Nb_2O_5$, $Ta_2O_5$, $WO_3$, $In_2O_3$, or any combination thereof. The first ceramic particles and the second ceramic particles may be insulating particles. Because the first ceramic coating layer 113a and the second ceramic coating layer 113b include insulating particles, a direct contact between the positive electrode substrate 111 and the negative electrode substrate 131 may be blocked, thereby effectively preventing or substantially preventing a short circuit caused by cracks occurring inside the electrode assembly 100. A method of arranging the first ceramic coating layer 113a in the first uncoated portion 115a and arranging the second ceramic coating layer 113b in the second uncoated portion 115b is not particularly limited. The first ceramic coating layer 113a and the second ceramic coating layer 113b may be arranged by a dry method or a wet method. As a dry method, for example, an amorphous layer may be formed by atomic layer deposition (ALD), chemical vapor deposition (CVD), physical vapor deposition (PVD), or the like. However, the method is not limited thereto, and any dry methods commonly used in the art may also be used. Examples of the chemical vapor deposition (CVD) may include thermal CVD, plasma enhanced CVD (PECVD), atmospheric pressure CVD (APCVD), and low pressure CVD (LPCVD). Examples of the physical vapor deposition (PVD) may include thermal evaporation, electron-beam evaporation, and sputtering. As a wet method, a layer may be formed by, for example, spin coating, dip coating, and bar coating. However, the method is not limited thereto, and any wet methods commonly used in the art may also be used. The first ceramic coating layer 113a may be disposed on the first uncoated portion 115a, for example, by coating the first uncoated portion 115a with a composition including the first ceramic particles, a binder, and a solvent, and drying the coated composition. The second ceramic coating layer 113b may be disposed on the second uncoated portion 115b, for example, by coating the second uncoated portion 115b with a composition including the second ceramic particles, a binder, and a solvent, and drying the coated composition. The first ceramic coating layer 113a and the second ceramic coating layer 113b may each independently have a single-layer structure or a multi-layered structure including a plurality of layers.

Particle diameters of the first ceramic particles and the second ceramic particles may be each independently, for example, from 0.1 $\mu$m to 20 $\mu$m, from 0.1 $\mu$m to 15 $\mu$m, from 0.1 $\mu$m to 10 $\mu$m, or from 1 $\mu$m to 5 $\mu$m. By designing the particle diameters of the first ceramic particles and the second ceramic particles within the above-described ranges, short circuits may be effectively prevented or substantially prevented in the electrode assembly 100. The particle diameters of the first ceramic particles and the second ceramic particles may be, for example, average particle diameters. The average particle diameter may be measured by using, for example, a device using laser diffraction or dynamic light-scattering. The average particle diameter may be measured by using, for example, a laser scattering particle size distribution analyzer (e.g., LA-920 from Horiba Instruments, Inc.), and may be a value of median particle diameter (D50) at 50% of a total cumulative particle diameter distribution of particles from the smallest particle diameter. Alternatively, the average particle diameter may be an arithmetic average of particle diameters of the particles measured by image analysis performed by software or manuals on images of an optical microscope or a scanning electron microscope.

The particle diameters of the first ceramic particles may be different from those of the second ceramic particles. In the case where physical properties required for inner and outer sides of the electrode assembly are different, the first ceramic particles and the second ceramic particles may be selected to have different particle diameters to more effectively satisfy these physical properties. For example, the particle diameters of the first ceramic particles may be greater than those of the second ceramic particles. By designing the particle diameters of the first ceramic particles to be greater than those of the second ceramic particles, for example, possibility of a short circuit caused by an external impact may be more effectively prevented or substantially prevented. For example, the first ceramic particles may have a bimodal particle diameter distribution. Therefore, in the case of the first ceramic particles include both large-diameter particles and small-diameter particles, packing density of the ceramic coating layer may be increased. A ceramic coating layer having a high packing density may more effectively prevent or reduce the chance of a short circuit of a positive electrode substrate.

The first ceramic particles and the second ceramic particles may each independently have a spherical, plate-like, or acicular shape. For example, the first ceramic particles and the second ceramic particles may have an irregular shape, respectively. The shape of the first ceramic particles may be different from that of the second ceramic particles. In the case where the inner and the outer sides of the electrode assembly have different physical properties, the first ceramic particles and the second ceramic particles may be selected to have different shapes to more effectively satisfy such physical properties. For example, by designing the first ceramic particles to have a plate-like shape, the first ceramic coating layer 113a may have improved durability against an external impact. By designing the second ceramic particles to have an acicular shape, the second ceramic coating layer 113b may have an improved heat dissipation effect.

Figure 3:
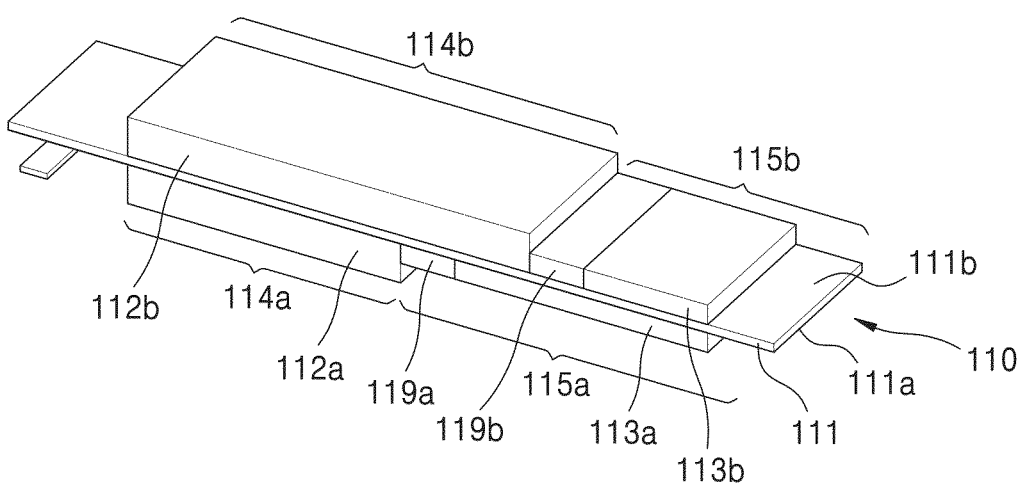
FIG. 3 is a perspective view of a positive electrode including a ceramic coating layer and an organic insulating layer, according to one or more embodiments of the present disclosure.

FIG. 3 is a perspective view of a positive electrode 110 further including a first organic insulating layer 119a and a second organic insulating layer 119b according to one or more embodiments of the present disclosure.

The positive electrode 110 may further include the first organic insulating layer 119a arranged between the positive active material layer 112a and the first ceramic coating layer 113a. Also, the positive electrode 110 may further include the second organic insulating layer 119b arranged between the positive active material layer 112b and the second ceramic coating layer 113b. Between the curved portion and the straight portion included in the first uncoated portion 115a, the first organic insulating layer 119a may be disposed, for example, on the curved portion. By locating the first organic insulating layer 119a in the curved portion, cracks of the positive electrode substrate 111 occurring in the curved portion may be effectively prevented or substantially prevented. Between the curved portion and the straight portion included in the second uncoated portion 115b, the second organic insulating layer 119b may be disposed, for example, on the curved portion. By arranging the second organic insulating layer 119b in the curved portion, cracks of the positive electrode substrate 111 occurring in the curved portion may be effectively prevented or substantially prevented and a short circuit between the positive electrode 110 and the negative electrode 130 may further be inhibited or reduced.

FIG. 2 is a cross-sectional view of a wound electrode assembly including the first organic insulating layer 119a and the second organic insulating layer 119b according to one or more embodiments of the present disclosure.

The positive electrode 110 may include the first uncoated portion 115a. The first uncoated portion 115a may include the first curved portion 117a and the first straight portion 118a, the third curved portion 117c and the third straight portion 118c sequentially extending from the first straight portion 118a, and the fifth curved portion 117e and the fifth straight portion 118e sequentially extending from the third straight portion 118c and may further include a seventh curved portion 117g and a seventh straight portion 118g sequentially extending from the fifth straight portion 118e. The first organic insulating layer 119a may be located in the seventh curved portion 117g. Because the positive electrode 110 includes the seventh curved portion 117g and the first organic insulating layer 119a is located in the seventh curved portion 117g, possibility of a short circuit caused by contact between the negative electrode 130 and the positive electrode 110 at the other side surface of the electrode assembly 100 may be prevented or substantially prevented. Therefore, safety of the electrode assembly 100 may be improved. More specifically, because the positive electrode 110 includes the seventh curved portion 117g and the first organic insulating layer 119a is located in the seventh curved portion 117g, contact between the first uncoated portion 115a included in the positive electrode 110 and a fourth uncoated portion 135b included in the negative electrode 130 may be blocked, and accordingly, possibility of a short circuit caused by the contact between the positive electrode 110 and the negative electrode 130 may be more effectively prevented or substantially prevented.

The positive electrode 110 includes the second uncoated portion 115b. The second uncoated portion 115b may include the second curved portion 117b and the second straight portion 118b, and a fourth curved portion 117d and a fourth straight portion 118d sequentially extending from the second straight portion 118b and may further include a sixth curved portion 117f and a sixth straight portion 118f sequentially extending from the fourth straight portion 118d. The second organic insulating layer 119b may be located in the fourth curved portion 117d. Because the positive electrode 110 includes the fourth curved portion 117d and the second organic insulating layer 119b is located in the fourth curved portion 117d, the possibility of a short circuit caused by contact between the negative electrode 130 and the positive electrode 110 at the other side surface of the electrode assembly 100 may be prevented or substantially prevented. Therefore, safety of the electrode assembly 100 may be improved. More specifically, because the positive electrode 110 includes the fourth curved portion 117d and the second organic insulating layer 119b is located in the fourth curved portion 117d, contact between the second uncoated portion 115b included in the positive electrode 110 and the third uncoated portion 135a included in the negative electrode 130 may be blocked, and accordingly, possibility of a short circuit caused by the contact between the positive electrode 110 and the negative electrode 130 may be more effectively prevented or substantially prevented.

Because the negative electrode 130 is absent between the first curved portion 117a and the fifth curved portion 117e included in the positive electrode 110 in one side surface of the electrode assembly 100, the possibility of a short circuit caused by contact between the negative electrode 130 and the positive electrode 110 may be prevented or substantially prevented in the side surface. Because the second organic insulating layer 119b is located in the fourth curved portion 117d and/or the first organic insulating layer 119a is located in the seventh curved portion 117g in the positive electrode 110 in the other side surface of the electrode assembly 100 opposite to the one side surface, the possibility of a short circuit caused by contact between the positive electrode 110 and the negative electrode 130 may be more effectively prevented or substantially prevented. As a result, the possibility of a short circuit caused by an external impact may further be prevented or substantially prevented at both side surfaces of the electrode assembly 100.

The first organic insulating layer 119a and the second organic insulating layer 119b may include, for example, an insulating tape. The insulating tape may include an insulating polymer. The insulating tape may have, for example, a structure including an insulating polymer substrate layer and an adhesive layer disposed on one or both surfaces of the insulating polymer substrate layer. Examples of the insulating polymer may include polytetrafluoroethylene (PTFE), polytetrafluoroethylene-ethylene (ETFE), polytetrafluoroethylene-perfluoroalkylvinyl ether (PFA), polyacrylate (PA), styrene-butadiene rubber (SBR), polyimide (PI), liquid crystalline polymer (LCP), polyphenylene sulfide (PPS), polybutylene terephthalate (PBT), polyethylene terephthalate (PET), polyethylene (PE), polypropylene (PP), polyvinyl chloride (PVC), polyvinylidene fluoride (PVdF), polyvinylidenefluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethylsucrose, pullulan, carboxyl methyl cellulose, or any combination thereof. The insulating tape may further include insulating inorganic particles. By further including the insulating inorganic particles, the insulating tape may have increased mechanical strength and an improved heat dissipation property. A thickness of the insulating tape may be, for example, from 1 μm to 30 μm, from 1 μm to 25 μm, from 1 μm to 20 μm, from 1 μm to 15 μm, from 1 μm to 10 μm, or from 1 μm to 5 μm.

Figure 4:
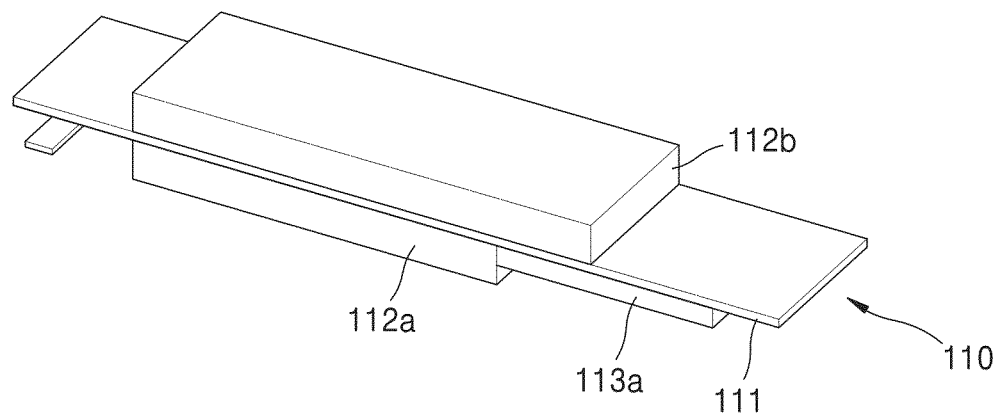
FIG. 4 is a perspective view of a positive electrode of the related art including a ceramic coating layer disposed on only one surface thereof.

FIG. 4 is a perspective view of a positive electrode of the related art including only a first ceramic coating layer 113a without including a second ceramic coating layer.

Figure 5:
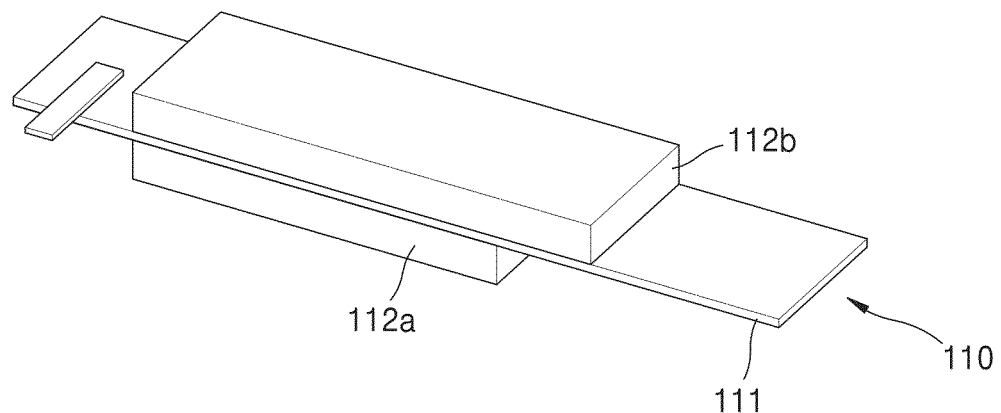
FIG. 5 is a perspective view of a positive electrode of the related art not including a ceramic coating layer.

FIG. 5 is a perspective view of a positive electrode in the related art including neither a first ceramic coating layer nor a second ceramic coating layer.

A positive electrode 110 of the related art may include only a first ceramic coating layer 113a without including a second ceramic coating layer 113b or may include neither the first ceramic coating layer 113a nor the second ceramic coating layer 113b. Because at least one of the first ceramic coating layer 113a and/or the second ceramic coating layer 113b is not included in the positive electrode, safety of a lithium battery including the positive electrode may deteriorate. For example, possibility of a short circuit caused by contact between the positive electrode substrate 111 included in the positive electrode 110 and the negative electrode due to an internal and/or external impact may increase.

Negative Electrode

The negative electrode 130, as shown, for example, in FIG. 1, includes a negative electrode substrate 131, and negative active material layers 132a and 132b disposed on both sides of the negative electrode substrate 131. The negative electrode substrate 131 includes a third surface 131a and a fourth surface 131b opposite to the third surface 131a. The third surface 131a of the negative electrode substrate 131 includes a third coated portion 134a at (in) which the negative active material layer 132a is located and a third uncoated portion 135a located at (in) a winding end portion 130b and free from the negative active material layer 132a. The fourth surface 131b of the negative electrode substrate 131 includes a fourth coated portion 134b at (in) which the negative active material layer 132b is located and a fourth uncoated portion 135b located at (in) a winding end portion 130b and free from the negative active material layer 132b. In addition, the third surface 131a of the negative electrode substrate includes a seventh uncoated portion 136a located at (in) a winding start portion 130a and free from the negative active material layer 132a, and the fourth surface 131b of the negative electrode substrate includes an eighth uncoated portion 136b located at (in) the winding start portion 130a and free from the negative active material layer 132b. The third uncoated portion 135a is located adjacent to an inner side of the fourth curved portion 117d included in the positive electrode, and the third uncoated portion 135a is arranged to face the fourth curved portion 117d. By arranging the second organic insulating layer 119b in the fourth curved portion 117d of the positive electrode and arranging the third uncoated portion 135a of the negative electrode adjacent to the inner side of the fourth curved portion 117d, the possibility of a short circuit caused by contact between the third uncoated portion 135a of the negative electrode and the positive electrode 110 may be prevented reduced. The fourth uncoated portion 135b is located adjacent to an outer side of the seventh curved portion 117g of the positive electrode 110, and the fourth uncoated portion 135b is arranged to face the seventh curved portion 117g. By arranging the first organic insulating layer 119a in the seventh curved portion 117g of the positive electrode 110 and arranging the fourth uncoated portion 135b of the negative electrode 130 adjacent to the outer side of the seventh curved portion 117g, the possibility of a short circuit caused by contact between the fourth uncoated portion 135b of the negative electrode 130 and the positive electrode 110 may be prevented reduced.

Electrode Tab

Referring to FIG. 1, the first surface 111a of the positive electrode 110 may further include a fifth uncoated portion 116a located at (in) a winding start portion 110a and free from the positive active material layer 112a, and the second surface 111b of the positive electrode may further include a sixth uncoated portion 116b located at (in) the winding start portion 110a and free from the positive active material layer 112b. The positive electrode 110 may include a first positive electrode tab 210a disposed on the fifth uncoated portion 116a or the sixth uncoated portion 116b. The first positive electrode tab 210a may be arranged to extend in a direction different from a longitudinal direction (X direction) of the positive electrode 110 that is a winding direction of the positive electrode 110. The first positive electrode tab 210a may be arranged, for example, to extend in a direction at an angle of 10° to 90°, 30° to 90°, 45° to 90°, or 60° to 90° with respect to the winding direction of the positive electrode 110. The first positive electrode tab 210a may be arranged to extend in a direction (Y direction) perpendicular to the winding direction of the positive electrode 110. The first positive electrode tab 210a may be arranged, for example, to extend in the winding axis direction of the positive electrode 110. The first positive electrode tab 210a may be arranged toward a lower end or an upper end of the exterior material. The positive electrode may further include a second positive electrode tab disposed on the first uncoated portion 115a and/or the second uncoated portion 115b. The second positive electrode tab may be arranged, for example, to extend in the winding axis direction of the positive electrode 110. The second positive electrode tab may be arranged toward a lower end or an upper end of the exterior material.

The third surface 131a of the negative electrode may further include a seventh uncoated portion 136a located at (in) the winding start portion 130a and free from the negative active material layer 132a, and the fourth surface 131b of the negative electrode may further include an eighth uncoated portion 136b located at (in) the winding start portion 130a and free from the negative active material layer 132b. The negative electrode 130 may include a first negative electrode tab 230a disposed on the seventh uncoated portion 136a or the eighth uncoated portion 136b. The first negative electrode tab 230a may be arranged to extend in a direction different from a longitudinal direction (X direction) of the negative electrode 130 that is a winding direction of the negative electrode 130. The first negative electrode tab 230a may be arranged, for example, to extend in a direction at an angle of 10° to 90°, 30° to 90°, 45° to 90°, or 60° to 90° with respect to the winding direction of the negative electrode 130. The first negative electrode tab 230a may be arranged to extend in a direction (Y direction) perpendicular to the winding direction of the negative electrode 130. The first negative electrode tab 230a may be arranged, for example, to extend in the winding axis direction of the negative electrode 130. The first negative electrode tab 230a may be arranged toward a lower end or an upper end of the exterior material. The negative electrode may further include a second negative electrode tab disposed on the third uncoated portion 135a and/or the fourth uncoated portion 135b. The second negative electrode tab may be arranged, for example, to extend in the winding axis direction of the negative electrode 130. The second negative electrode tab may be arranged toward the lower end or the upper end of the exterior material.

Protective Tape

Figure 6:
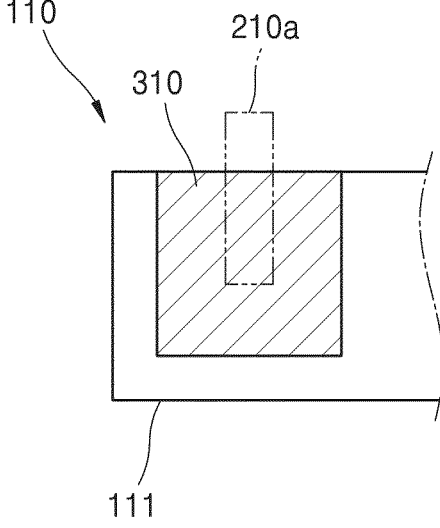
FIG. 6 is a partial plan view of a positive electrode including a protective tape attached to a positive electrode tab, according to one or more embodiments of the present disclosure.

FIG. 6 is a partial plan view of a positive electrode 110 including a first protective tape 310 disposed over a first positive electrode tab 210a located at a winding start portion 110a according to one or more embodiments of the present disclosure.

The first protective tape 310 may be disposed on the first positive electrode tab 210a. The first protective tape 310 may prevent separators 120 and 140 from being damaged by the first positive electrode tab 210a. The first protective tape 310 may prevent deformation of the winding start portion 130a of the negative electrode 130 caused by the first positive electrode tab 210a and prevent contact between the first positive electrode tab 210a and the negative electrode 130. Therefore, safety of the electrode assembly 100 may be improved.

The first protective tape 310 may be formed of, for example, an insulating material. For example, the first protective tape 310 may be an insulating tape. The insulating tape may include an insulating substrate and adhesive layers disposed on one or both surfaces of the insulating substrate. The first protective tape 310 may be formed of, for example, a heat dissipation material. For example, high-temperature heat is generated during charging and discharging or when a short circuit occurs, and the electrode assembly 100 may explode or ignite by this heat. To prevent the explosion or ignition, the first protective tape 310 may be formed of a heat dissipation material. For example, the first protective tape 310 may be a heat dissipation tape. Therefore, the heat generated in the outer side of the electrode assembly 100 may be quickly released to the outside of the electrode assembly 100 through the first protective tape 310. Therefore, a temperature rise of the electrode assembly 100 may be inhibited or reduced. Also, explosion or ignition of the electrode assembly 100 may be prevented or substantially prevented.

The first protective tape 310 may be disposed on both surfaces of the positive electrode substrate 111. The first protective tape 310 may be disposed on both the first surface 111a and the second surface 111b of the positive electrode 110. The first protective tape 310 may extend from the fifth uncoated portion 116a and/or the sixth uncoated portion 116b to the first coated portion 114a and/or the second coated portion 114b. Therefore, the first protective tape 310 may be in contact with the positive active material layers 112a and 112b. Therefore, contact between the fifth uncoated portion 116a and/or the sixth uncoated portion 116b of the positive electrode and the negative electrode substrate 131 may be prevented or reduced at a core area of the electrode assembly 100.

The first protective tape 310 may be additionally located in the fourth curved portion 117d of the positive electrode. The first protective tape 310 may further be disposed on the second organic insulating layer 119b located in the fourth curved portion 117d of the positive electrode. For example, the second organic insulating layer 119b may be located in the fourth curved portion 117d of the positive electrode, and the first protective tape 310 may be additionally disposed over the second organic insulating layer 119b. By additionally locating the first protective tape 310 in the fourth curved portion 117d, a short circuit between the positive electrode 110 and the negative electrode 130 may be prevented or reduced more effectively.

The first protective tape 310 may be additionally located in the seventh curved portion 117g of the positive electrode. The first protective tape 310 may further be disposed on the first organic insulating layer 119a located in the seventh curved portion 117g of the positive electrode. For example, the first organic insulating layer 119a may be located in the seventh curved portion 117g of the positive electrode, and the first protective tape 310 may be additionally disposed over the first organic insulating layer 119a. By additionally locating the first protective tape 310 on the seventh curved portion 117g, a short circuit between the positive electrode 110 and the negative electrode 130 may be prevented or reduced more effectively.

Figure 7:
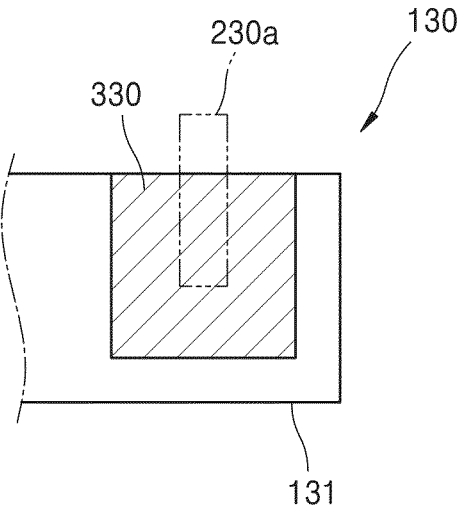
FIG. 7 is a partial plan view of a negative electrode including a protective tape attached to a negative electrode tab, according to an embodiments of the present disclosure.

FIG. 7 is a partial plan view of a negative electrode 130 including a second protective tape 330 disposed over the first negative electrode tab 230a located at (in) the winding start portion 130a according to one or more embodiments of the present disclosure.

The second protective tape 330 may be disposed on the first negative electrode tab 230a. The second protective tape 330 may prevent separators 120 and 140 from being damaged by the first negative electrode tab 230a. The second protective tape 330 may prevent deformation of the winding start portion 130a of the negative electrode 130 caused by the first positive electrode tab 210a and prevent contact between the first negative electrode tab 230a and the positive electrode 110. Therefore, safety of the electrode assembly 100 may be improved. The second protective tape 330 may be formed of the same material as that of the first protective tape 310. For example, the second protective tape 330 may be an insulating tape. The insulating tape may include an insulating substrate and adhesive layers disposed on one or both surfaces of the insulating substrate. The second protective tape 330 may be formed of, for example, a heat dissipation material. For example, the second protective tape 330 may be a heat dissipation tape. The second protective tape 330 may be disposed on both surfaces of the negative electrode substrate 131. The second protective tape 330 may be disposed on both the third surface 131a and the fourth surface 131b of the negative electrode.

The second protective tape 330 may be located in the seventh uncoated portion 136a and/or the eighth uncoated portion 136b to be spaced apart from the third coated portion 134a and/or the fourth coated portion 134b. Therefore, the second protective tape 330 may not be in contact with the negative active material layers 132a and 132b at (in) the winding start portion 130a.

Shape of Electrode Assembly

Figure 8:
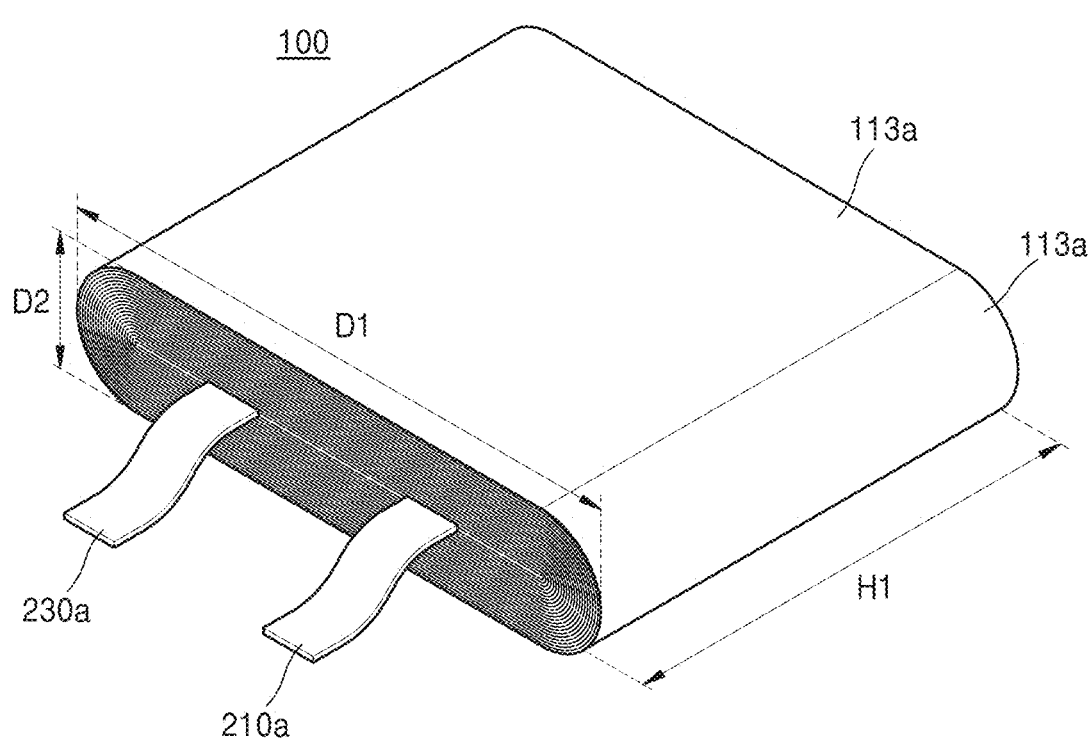
FIG. 8 is a perspective view of a wound electrode assembly according to one or more embodiments of the present disclosure.

FIG. 8 is a perspective view of an electrode assembly 100 manufactured by winding a positive electrode 110, separators 120 and 140, and a negative electrode 130, according to one or more embodiments of the present disclosure.

The positive electrode 110 is located in an outermost area of the electrode assembly 100, and the first ceramic coating layer 113a located at (in) the first uncoated portion 115a of the positive electrode 110 may surround the outermost surface of the electrode assembly one or more times.

Therefore, a short circuit caused by an external impact may be more effectively prevented or reduced in the electrode assembly.

A height H1 of the winding axis direction of the electrode assembly 100 is, for example, 20 mm or more, 40 mm or more, 60 mm or more, 80 mm or more, 100 mm or more, 150 mm or more, or 200 mm or more.

The height H1 of the winding axis direction of the electrode assembly 100 is, for example, from 20 mm to 250 mm, from 40 mm to 250 mm, from 60 mm to 250 mm, from 80 mm to 250 mm, from 100 mm to 250 mm, from 150 mm to 250 mm, or from 200 mm to 250 mm.

A diameter D1 of a major axis direction perpendicular to the winding direction of the electrode assembly 100 is, for example, 20 mm or more, 40 mm or more, 60 mm or more, 80 mm or more, or 100 mm or more.

The diameter D1 of the major axis direction perpendicular to the winding direction of the electrode assembly 100 is, for example, from 20 mm to 150 mm, from 40 mm to 150 mm, from 60 mm to 150 mm, from 80 mm to 150 mm, or from 100 mm to 150 mm.

A diameter D2 of a minor axis direction perpendicular to the winding direction of the electrode assembly 100 is, for example, 3 mm or more, 5 mm or more, 7 mm or more, 10 mm or more, or 15 mm or more.

The diameter D2 of the minor axis direction perpendicular to the winding direction of the electrode assembly 100 is, for example, from 3 mm to 20 mm, from 5 mm to 20 mm, from 7 mm to 20 mm, from 10 mm to 20 mm, or from 15 mm to 20 mm.

A D2/D1 ratio of the diameter D2 of the minor axis direction to the diameter D1 of the major axis direction which are perpendicular to the winding direction of the electrode assembly 100 may be 1 or less. The D2/D1 ratio of the diameter D2 of the minor axis to the diameter D1 of the major axis direction which are perpendicular to the winding direction of the electrode assembly 100 may be from 0.1 to 1, from 0.1 to 0.7, from 0.1 to 0.5, or from 0.1 to 0.4. In the case where the D2/D1 ratio is greater than 1, the electrode assembly is too thin. Thus, the electrode assembly is vulnerable to an external impact to the extent that the electrode assembly is easily bent by an external impact. In the case where the D2/D1 ratio is less than 0.1, the electrode assembly is too thick to deviate from an allowable range in designs of common pouch cells.

Secondary Battery

A secondary battery according to one or more embodiments includes an exterior material, and an electrode assembly accommodated in the exterior material.

Figure 9:
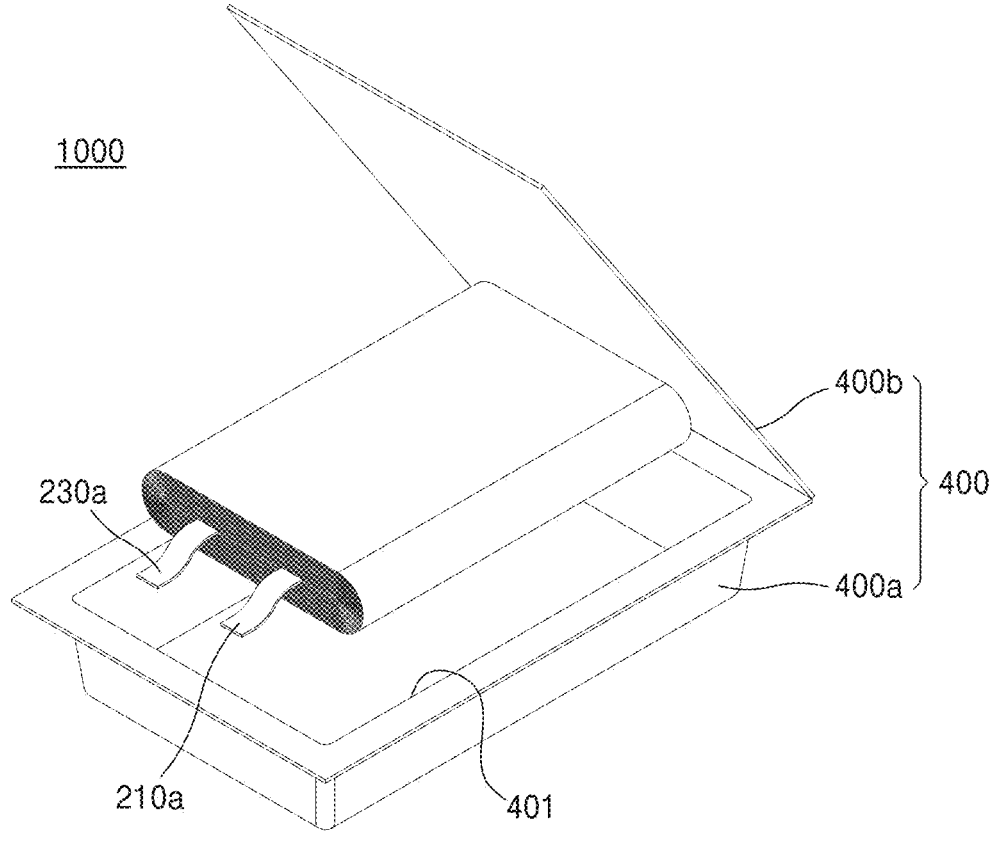
FIG. 9 is an exploded perspective view of a pouch cell secondary battery according to one or more embodiments of the present disclosure.

Referring to FIG. 9, a secondary battery 1000 includes an electrode assembly 100, and an exterior material 400 having an internal space and housing the electrode assembly 100 and an electrolyte. The exterior material 400 includes a first exterior material 400a having an internal space and housing the electrode assembly 100 and an electrolyte in the internal space, and a second exterior material 400b coupled to the top of the first exterior material 400a to seal the first exterior material 400a.

Positive Electrode

The positive electrode may be, for example, a cathode.

A positive electrode is prepared. Although the positive electrode is prepared, for example, by the following exemplary method, the method is not limited thereto and may be adjusted according to required or desired conditions.

In one or more embodiments, a positive active material composition is prepared by mixing a positive active material, a conductive material, a binder, and a solvent. The positive active material composition is coated on a portion of an aluminum current collector, as a positive electrode substrate, and dried to prepare a positive electrode plate.

Alternatively, the positive electrode plate may be prepared by casting the positive active material composition on a separate support and laminating a film separated from the support on an aluminum current collector.

The positive electrode plate includes a positive active material-coated portion (i.e., positive active material layer) in (at) which the positive active material is coated on an aluminum collector, and positive active material-free first uncoated portion 115a and second uncoated portion 115b respectively located on the aluminum current collector at one side of the positive active material-coated portion.

The first ceramic coating layer 113a and the second ceramic coating layer 113b are located in the first uncoated portion 115a and the second uncoated portion 115b, respectively. For descriptions of a material used in the ceramic coating layer, refer to the descriptions about the electrode assembly given above.

The positive active material may be any lithium-containing metal oxide commonly used in the art without limitation. For example, one or more types of composite oxides of lithium and a metal of (e.g., a metal selected from) cobalt, manganese, nickel, and/or a combination thereof may be used. The positive active material may include, for example, at least one of (e.g., at least one selected from) lithium cobalt oxide, lithium nickel cobalt manganese oxide, lithium nickel cobalt aluminum oxide, lithium iron phosphate, and/or lithium manganese oxide, but the present disclosure is not limited thereto, and any materials commonly used in the art as positive active materials of lithium batteries may also be used.

The positive active material may be, for example, a compound represented by one of the following formulae: $Li_aA_{1-b}B_bD_2$ (where $0.90 \leq a \leq 1.8$ and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_\alpha O_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_\alpha GeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2GbO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the compounds described above, A is Ni, Co, Mn, or any combination thereof; B is Al, Ni, Co, Mn, Cr, Fe, Mg, Sr, V, a rare earth element, or any combination thereof; D is O, F, S, P, or any combination thereof; E is Co, Mn, or any combination thereof; F is F, S, P, or any combination thereof; G is Al, Cr, Mn, Fe, Mg, La, Ce, Sr, V, or any combination thereof; Q is Ti, Mo, Mn, or any combination thereof; I is Cr, V, Fe, Sc, Y, or any combination thereof; and J is V, Cr, Mn, Co, Ni, Cu, or any combination thereof.

The above-described compound having a coating layer on the surface thereof may be used or a mixture of the above-described compound and a compound having a coating layer may also be used. The coating layer added to the surface of the compound includes, for example, a compound of a coating element such as an oxide, hydroxide, oxyhydroxide, oxycarbonate, or hydroxycarbonate of the coating element. The compound constituting the coating layer is amorphous or crystalline. The coating element included in the coating layer may be Mg, Al, Co, K, Na, Ca, Si, Ti, V, Sn, Ge, Ga, B, As, Zr, or any mixture thereof. A method of forming the coating layer may include or may be is selected from those that do not adversely affect physical properties of the positive active material. The coating methods is, for example, spray coating and/or dip coating. These methods are generally available to those of ordinary skill in the art, and thus detailed descriptions thereof will not be given.

For example, the positive active material may be $LiNiO_2$, $LiCoO_2$, $LiMn_xO_{2x}$ (where x=1, 2), $LiNi_{1-x}Mn_xO_2$ (where 0<x<1), $LiNi_{1-x-y}Co_xMn_yO_2$ (where 0≤x≤0.5 and 0≤y≤0.5), $LiFeO_2$, $V_2O_5$, TiS, MOS, and/or the like.

The positive active material may include, for example, at least one of $Li_aNi_xCo_yM_zO_{2-b}A_b$ (where 1.0≤a≤1.2, 0≤b≤0.2, 0.8≤x<1, 0≤y≤0.3, 0<z≤0.3, and x+y+z=1, M includes at least one of manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and/or boron (B), and A is F, S, CI, Br, or any combination thereof), $LiNi_xCo_yMn_zO_2$ (where 0.8≤x≤0.95, 0<y≤0.2, 0<z≤0.2, and x+y+z=1), $LiNi_xCo_yAl_zO_2$ (where 0.8≤x≤0.95, 0≤y≤0.2, 0<z≤0.2, and x+y+z=1), $LiNi_xCo_yAl_vMn_wO_2$ (where 0.8≤x≤0.95, 0≤y≤0.2, 0<v≤0.2, 0<w≤0.2, and x+y+v+W=1), or $Li_aNi_xMn_yM'_zO_{2-b}A_b$ (where 1.0≤a≤1.2, 0≤b≤0.2, 0<x≤0.3, 0.5≤y<1, 0<z≤0.3, and x+y+z=1, M' is cobalt (Co), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or any combination thereof, and A is F, S, Cl, Br, or any combination thereof).

The conductive material, the binder, and the solvent of the positive active material composition may be the same as those of the negative active material composition. Meanwhile, a plasticizer may further be added to the positive active material composition and/or the negative active material composition to form pores inside the electrode plates.

Amounts of the positive active material, the conductive material, the binder, and the solvent may be the same levels as those commonly used in lithium batteries. At least one of the conductive material, the binder, and/or the solvent may be omitted in accordance with a purpose and a structure of the lithium battery.

An amount of the binder included in the positive electrode may be, for example, from 0.1 to 10 wt % or from 0.1 to 5 wt % based on a total weight of the positive active material layer. An amount of the conductive material included in the positive electrode may be, for example, from 0.1 to 10 wt % or from 0.1 to 5 wt % based on the total weight of the positive active material layer. An amount of the positive active material included in the positive electrode may be, for example, from 70 wt % to 99 wt %, from 90 wt % to 99 wt %, or from 95 wt % to 99 wt % based on the total weight of the positive active material layer.

The fifth uncoated portion 116a and the sixth uncoated portion 116b are arranged at (in) the winding start portion 110a of a positive electrode plate, and the first positive electrode tab 210a is arranged at (in) the fifth uncoated portion 116a and/or the sixth uncoated portion 116b. The first positive electrode tab 210a may be introduced, for example, by welding. The first positive electrode tab 210a may be drawn out of the exterior material 400.

Negative Electrode

The negative electrode may be, for example, an anode.

In one or more embodiments, a negative electrode is prepared. Although the negative electrode is prepared by the following exemplary method, the method is not limited thereto and may be adjusted according to required or desired conditions.

First, a negative active material composition is prepared by mixing a composite negative active material, a conductive material, a binder, and a solvent. The prepared negative active material composition is coated on a portion of a copper current collector, as a negative electrode substrate, and dried to prepare a negative electrode plate.

Alternatively, the negative active material composition may be cast on a separate support and a film separated from the support may be laminated on the copper current collector to prepare a negative electrode plate on which a negative active material layer is formed.

The negative electrode plate includes a negative active material-coated portion (i.e., negative active material layer) in (at) which the negative active material is coated on the copper current collector, and a third uncoated portion 135a and a fourth uncoated portion 135b respectively located on the copper current collector at one side surface of the negative active material-coated portion and free from the negative active material.

For example, the negative active material may include at least one of (e.g., at least one selected from the group consisting of) lithium metal, a metal alloyable with lithium, a transition metal oxide, a non-transition metal oxide, and/or a carbonaceous material, but the present disclosure is not limited thereto and any materials used as negative active materials of lithium batteries may also be used. For example, the metal alloyable with lithium may be Si, Sn, Al, Ge, Pb, Bi, Sb, an Si—X alloy (where X is alkali metal, alkali earth metal, Group 13 element, Group 14 element, transition metal, rear earth element, or any combination thereof, except for Si), an Sn—X alloy (where X is alkali metal, alkali earth metal, Group 13 element, Group 14 element, transition metal, rear earth element, or any combination thereof, except for Sn), or the like. The element X may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof. For example, the transition metal oxide may be lithium titanium oxide, vanadium oxide, lithium vanadium oxide, or the like. For example, the non-transition metal oxide may be SiOx (where 0<x<2), $SiO_2$, $SnO_2$, or the like. The carbonaceous material may be, for example, crystalline carbon, amorphous carbon, or any mixture thereof. The crystalline carbon may be, for example, graphite such as natural graphite or artificial graphite in amorphous, plate-like, flake, spherical or fibrous form. The amorphous carbon may be, for example, soft carbon (carbon calcined at low temperature) or hard carbon, mesophase pitch, carbide, or calcined coke.

The conductive material may be, but is not limited to, carbon black, graphite particulates, natural graphite, artificial graphite, acetylene black, Ketjen black, carbon fiber; carbon nanotubes; metal such as copper, nickel, aluminum, and/or silver, each of which is used in powder, fiber, or tube form; or conductive polymers such as polyphenylene derivatives, and any material commonly used in the art as conductive materials may also be used.

The binder may be, but is not limited to, a vinylidene fluoride/hexafluoropropylene copolymer, polyvinylidene fluoride, polyacrylonitrile, polymethylmethacrylate, polytetrafluoroethylene (PTFE), mixtures thereof, or a styrene butadiene rubber polymer, polyacrylic acid, polyacrylic acid substituted with lithium, polyamideimide, polyimide, and any material commonly used in the art may also be used.

For example, the solvent may be, but is not limited to, N-methylpyrrolidone (NMP), acetone, and/or water, and any solvent commonly used in the art may also be used.

A plasticizer or a pore forming agent may further be added to the negative active material composition to form pores inside the electrode plate.

Amounts of the negative active material, the conductive material, the binder, and the solvent may be the same levels as those commonly used in lithium batteries. At least one of the conductive material, the binder, and/or the solvent may be omitted in accordance with a purpose and a structure of the lithium battery.

An amount of the binder included in the negative electrode may be, for example, from 0.1 to 10 wt % or from 0.1 to 5 wt % based on the total weight of the negative active material layer. An amount of the conductive material included in the negative electrode may be, for example, from 0.1 to 10 wt % or from 0.1 to 5 wt % based on the total weight of the negative active material layer. An amount of the negative active material included in the negative electrode may be from 0.1 wt % to 99 wt %, from 0.1 wt % to 90 wt %, from 0.1 wt % to 50 wt %, from 0.1 wt % to 30 wt %, from 0.1 wt % to 20 wt %, or from 0.1 wt % to 10 wt % based on a total weight of the negative active material layer.

The seventh uncoated portion 136a and the eighth uncoated portion 136b are located at (in) the winding start portion 130a of the negative electrode plate, and the first negative electrode tab 230a is located in the seventh uncoated portion 136a and/or the eighth uncoated portion 136b. The first negative electrode tab 230a may be introduced, for example, by welding. The first negative electrode tab 230a may be drawn out of the exterior material 400.

Separator

In one or more embodiments, a separator to be disposed between the positive electrode and the negative electrode is prepared.

Any separator commonly used in the art for lithium batteries may be used. For example, any separator having low resistance to ion migration of the electrolyte and excellent or suitable electrolyte-retaining ability may be used. For example, the separator may be (e.g., is selected from) glass fiber, polyester, Teflon, polyethylene, polypropylene, polytetrafluoroethylene (PTFE), or any combination thereof, each of which is a non-woven or woven fabric. For example, a windable separator including polyethylene or polypropylene may be used in lithium-ion batteries and a separator having excellent or suitable organic electrolyte-retaining ability may be used in lithium-ion polymer batteries.

The separator is prepared according to the following example method. However, the method is not limited thereto and may be adjusted according to required or desired conditions.

First, a polymer resin, a filler, and a solvent are mixed to prepare a separator composition. The separator composition is directly coated on an electrode and dried to prepare a separator. Alternatively, the separator composition is cast on a support and dried and then a separator film separated from the support is laminated on an electrode to form a separator.

The polymer used to prepare the separator is not particularly limited and any polymer commonly used as a binder for electrode plates may also be used. For example, a vinylidene fluoride/hexafluoropropylene copolymer, a polyvinylidene-fluoride (PVDF), polyacrylonitrile, polymethylmethacrylate, or any mixture thereof may be used.

Electrolyte

In one or more embodiments, an electrolyte is prepared.

For example, the electrolyte may be an organic electrolytic solution. The electrolytic solution is prepared, for example, by dissolving a lithium salt in an organic solvent.

Any organic solvent commonly used in the art may be used. For example, the organic solvent is propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, $\gamma$-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or any mixture thereof.

The lithium salt may also be any lithium salt commonly used in the art. For example, the lithium salt is $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LIN(C_xF_{2x+1}SO_2)(C_yF_{2y+1}SO_2)$ (where $1 \leq x \leq 20$ and $1 \leq y \leq 20$), LiCl, LiI, or any mixture thereof.

Alternatively, the electrolyte may be a solid electrolyte. For example, the solid electrolyte is boron oxide, lithium oxynitride, or the like. However, the solid electrolyte is not limited thereto and any known solid electrolyte may be used. The solid electrolyte may be formed on the negative electrode by sputtering, or the like or a separate solid electrolyte sheet may be laminated on the negative electrode.

The solid electrolyte may be, for example, an oxide-based solid electrolyte or a sulfide-based solid electrolyte.

The solid electrolyte may be, for example, an oxide-based solid electrolyte. The oxide-based solid electrolyte may include, for example, at least one of (e.g., at least one selected from) $Li_{1+x+y}Al_xTi_{2-x}Si_yP_{3-y}O_{12}$ (where $0<x<2$ and $0 \leq y<3$), $BaTiO_3$, $Pb(Zr,Ti)O_3$ (PZT), $Pb_{1-x}La_xZr_{1-y}Ti_yO_3$ (PLZT, where $0 \leq x<1$, $0 \leq y<1$), $PB(Mg_3Nb_{2/3})O_3-PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ (where $0<x<2$, $0<y<1$, and $0<z<3$), $Li_{1+x+y}(Al, Ga)_x(Ti, Ge)_{2-x}Si_yP_{3-y}O_{12}$ (where $0 \leq x \leq 1$ and $0 \leq y \leq 1$), $Li_xLa_yTiO_3$ (where $0<x<2$ and $0<y<3$), $Li_2O$, LiOH, $Li_2CO_3$, $LiAlO_2$, $Li_2O-Al_2O_3-SiO_2-P_2O_5-TiO_2-GeO_2$, and/or $Li_{3+x}La_3M_2O_{12}$ (where M=Te, Nb, or Zr, and x is an integer from 1 to 10). The solid electrolyte is manufactured by a sintering method, or the like. For example, the oxide-based solid electrolyte is a garnet-type solid electrolyte of (e.g., selected from) $Li_7La_3Zr_2O_{12}$ (LLZO) and/or $Li_{3+x}La_3Zr_{2-a}M_aO_{12}$ (M doped LLZO, where M=Ga, W, Nb, Ta, or Al and x is an integer from 1 to 10).

For example, the solid electrolyte may include at least one of (e.g., at least one selected from) lithium sulfide, silicon sulfide, phosphorous sulfide, boron sulfide, and/or any combination thereof. The sulfide-based solid electrolyte particles may include $Li_2S$, $P_2S_5$, $SiS_2$, $GeS_2$, $B_2S_3$ or any combination thereof. The sulfide-based solid electrolyte particles may be $Li_2S$ or $P_2S_5$. Sulfide-based solid electrolyte particles are known to have higher lithium ion conductivity than other inorganic compounds. For example, the sulfide-based solid electrolyte includes $Li_2S$ and $P_2S_5$. In the case where a sulfide solid electrolyte material constituting the sulfide-based solid electrolyte includes $Li_2S-P_2S_5$, a mixing molar ratio of $Li_2S$ to $P_2S_5$ may be, for example, in the range of 50:50 to 90:10. In addition, an inorganic solid electrolyte prepared by adding $Li_3PO_4$, a halogen atom, a halogen compound, $Li_{2+2x}Zn_{1-x}GeO_4$ ""LISICO"", where $0 \leq x<1$), $Li_{3+y}PO_{4-x}N_x$ "LIPO", where $0<x<4$ and $0<y<3$), $Li_{3.25}Ge_{0.25}P_{0.75}S_4$ ""Thio-LISICO""), $Li_2O$—$Al_2O_3$—$TiO_2$—$P_2O_5$ ""LAT""), or the like to an inorganic solid electrolyte such as $Li_2S$—$P_2S_5$, $SiS_2$, $GeS_2$, $B_2S_3$, or any combination thereof may be used as the sulfide-based solid electrolyte. Examples of the sulfide-based solid electrolyte material may include, but are not limited to, $Li_2S$—$P_2S_5$; $Li_2S$—$P_2S_5$—$LiX$ (where X=halogen atom); $Li_2S$—$P_2S_5$—$Li_2O$; $Li_2S$—$P_2S_5$—$Li_2O$—$LiI$; $Li_2S$—$SiS_2$; $Li_2S$—$SiS_2$—$LiI$; $Li_2S$—$SiS_2$—$LiBr$; $Li_2S$—$SiS_2$—$LiCl$; $Li_2S$—$SiS_2$—$B_2S_3$—$LiI$; $Li_2S$—$SiS_2$—$P_2S_5$—$LiI$; $Li_2S$—$B_2S_3$; $Li_2S$—$P_2S_5$—$Z_mS_n$ (where $0<m<10$, $0<n<10$, and Z=Ge, Zn or Ga); $Li_2S$—$GeS_2$; $Li_2S$—$SiS_2$—$Li_3PO_4$; and $Li_2S$—$SiS_2$-$Li_pMO_q$ (where $0<p<10$, $0<q<10$, and M=P, Si, Ge, B, Al, Ga, or In). In this regard, the sulfide-based solid electrolyte material may be manufactured by treating starting materials (e.g., $Li_2S$ and $P_2S_5$) of the sulfide-based solid electrolyte by a melt quenching method, a mechanical milling method, or the like. Also, a calcination process may further be performed after the above process. The sulfide-based solid electrolyte may be in an amorphous or crystalline form or in a mixed form thereof.

Pouch Cell

Referring to FIGS. 1 to 9, the electrode assembly 100 is prepared by winding the positive electrode 110, the negative electrode 130, and the separators 120 and 140 in a jelly-roll form.

A pouch-type lithium battery 1000 includes a first exterior material 400a having an internal space 401 housing the electrode assembly 100 and a second exterior material 400b sealing the first exterior material 400a.

The first exterior material 400a and the second exterior material 400b may have a structure in which an insulating layer, a metal layer, and a protective layer are sequentially laminated. The insulating layer, as the innermost layer, may be formed of a material having insulating properties and thermo-adhesive properties. The insulating layer may be, for example, a polymer layer having insulating properties and hot-melt adhesion properties. The metal layer serves to prevent moisture permeation and loss of electrolyte. The metal layer may be, for example, an aluminum layer. The protective layer, as the outermost layer, serves to protect the secondary battery. The protective layer may be, for example, a polymer layer having durability. In FIG. 7, although the exterior material has a rectangular case shape, the shape is not limited thereto but may be selected according to a required or desired shape.

The electrode assembly 100 is accommodated in the internal space of the first exterior material 400a. The first positive electrode tab 210a and the first negative electrode tab 230a of the electrode assembly 100 may be drawn out of the sealed exterior material 400. After placing the electrode assembly 100 in the internal space 401 of the first exterior material 400a, an electrolytic solution is injected thereinto and the first exterior material 400a and the second exterior material 400b are sealed by applying heat and pressure along edges of the internal space 401, thereby completing preparation of the pouch-type lithium battery 1000.

The secondary battery may be, for example, a lithium secondary battery.

Due to excellent or suitable lifespan properties and high-rate characteristics, secondary batteries are used, for example, in electric vehicles (EVs). For example, secondary batteries are used in hybrid vehicles such as plug-in hybrid electric vehicles (PHEVs). In addition, lithium secondary batteries may be used in fields requiring a large amount of power storage. For example, lithium secondary batteries may be used in E-bikes and electric tools.

A plurality of secondary batteries may be stacked to form a battery module, and a plurality of battery modules constitutes a battery pack. Such battery packs may be used in any device that requires high capacity and high output. For example, battery packs may be used in laptop computers, smart phones, and electric vehicles. For example, a battery module includes a plurality of batteries and a frame holding the batteries. The battery pack may include, for example, a plurality of battery modules and a bus bar connecting the battery modules. The battery module and/or the battery pack may further include a cooling device. The plurality of battery packs are controlled by a battery management system. The battery management system includes a battery pack, and a battery control device connected to the battery pack.

Hereinafter, one or more embodiments will be described in detail with reference to the following examples and comparative examples. However, these examples and comparative examples are not intended to limit the purpose and scope of the one or more embodiments.

Preparation of Lithium Pouch Cell

Example 1: Arrangement of First and Second Ceramic Coating Layers

Preparation of Positive Electrode $LiCoO_2$ as a positive active material, a carbon conductive material (Denka Black), and polyvinylidene fluoride (PVdF) were mixed in a weight ratio of 92:4:4 and the mixture was mixed with N-methylpyrrolidone (NMP) using a line mixer to prepare a slurry.

The slurry was applied to a first surface of an aluminum current collector by bar coating and dried at 120° C. to prepare a first stack structure introduced with the positive active material layer.

Subsequently, a positive active material layer was introduced onto a second surface of the aluminum current collector in the same manner to prepare a second stack structure.

Boehmite and polyvinylidene fluoride (PVdF) were mixed in a weight ratio of 90:10 to prepare a slurry. Referring to FIG. 1, a ceramic coating layer was applied to a first uncoated portion 115a of the positive electrode-coated aluminum current collector which was not coated with the positive active material by bar coating and dried at 120° C. to prepare a first ceramic coating layer 113a. A ceramic coating layer was introduced into the second uncoated portion 115b of the aluminum current collector in the same manner to prepare a second ceramic coating layer 113b. The prepared electrode plate was rolled to prepare a positive electrode.

In the prepared positive electrode, a positive electrode tab was located on the fifth uncoated portion 116a or the sixth uncoated portion 116b.

A thickness of the first ceramic coating layer 113a after rolling was 20% of a thickness of the positive active material layer disposed on the first surface 111a, and a thickness of the second ceramic coating layer 113b was 20% of a thickness of the positive active material layer disposed on the second surface 111b.

The first ceramic coating layer and the second ceramic coating layer were in contact with only a side surface of the positive active material layer without being in contact with a top surface of the positive active material layer.

A length of the first ceramic coating layer in a longitudinal direction of the positive electrode was greater than that of the second ceramic coating layer.

The prepared positive electrode has a structure illustrated in FIG. 1.

The first ceramic coating layer includes first ceramic particles, the second ceramic coating layer includes second ceramic particles, and Boehmite particles having a D50 particle diameter of 1.8 μm were used for the first ceramic particles and the second ceramic particles, respectively.

Preparation of Negative Electrode

A mixture prepared by mixing artificial graphite, a styrene-butadiene rubber (SBR) binder, and carboxymethyl cellulose (CMC) in a weight ratio of 98:1:1 was added to distilled water and stirred using a mechanical stirrer to prepare a negative active material slurry.

The slurry was applied to a third surface of a copper current collector by bar coating and dried at room temperature, and then further dried in a vacuum at 120° C. to prepare a first stack structure introduced with a negative active material layer.

Subsequently, the negative active material layer was introduced onto a fourth surface of the copper current collector in the same manner to prepare a second stack structure. The second stack structure was rolled to prepare a negative electrode.

The prepared negative electrode includes a seventh uncoated portion located at (in) the winding start portion and free from the negative active material, a third uncoated portion located at (in) the winding end portion and free from the positive active material, and a third coated portion located between the third uncoated portion and the seventh uncoated portion and coated with the negative active material on the third surface, and includes an eighth uncoated portion located at (in) the winding start portion and free from the negative active material, a fourth uncoated portion located at (in) the winding end portion and free from the negative active material, and a fourth coated portion located between the fourth uncoated portion and the eighth uncoated portion and coated with the negative active material on the fourth surface. A first negative electrode tab was disposed on the eighth uncoated portion.

The prepared negative electrode had a structure illustrated in FIG. 1.

Preparation of Electrode Assembly

A positive electrode, a polyethylene separator, a negative electrode, and a separator were arranged as shown in FIG. 1 and then wound in a jelly-roll form from the winding start point (left end in FIG. 1) to the winding end point (right end in FIG. 1) to prepare a wound electrode assembly.

A first ceramic coating layer was located in the outermost area of the electrode assembly. The electrode assembly had a structure shown in FIG. 2.

Preparation of Pouch Cell 1.5 M LiPF$_6$, as a lithium salt, was added to a mixed solvent prepared by mixing ethylene carbonate (EC), ethyl-methyl carbonate (EMC), and dimethyl carbonate (DMC) in a volume ratio of 2:2:6 to prepare an electrolytic solution.

A pouch exterior material was prepared. The pouch exterior material was prepared as a laminate film in which a polymer resin and a metal thin film are stacked.

The wound electrode assembly was placed in the internal space of the pouch exterior material, and the first positive electrode tab and the first negative electrode tab were drawn out of the exterior material.

The electrolytic solution was injected into the internal space of the pouch exterior material and the pouch exterior material was sealed to complete preparation of a pouch cell.

The first ceramic coating layer located in the outermost area of the wound electrode assembly directly faced the pouch exterior material and was in direct contact with the pouch exterior material.

The pouch cell had a structure shown in FIG. 9.

Example 2: Thickness of First Ceramic Coating Layer<Thickness of Second Ceramic Coating Layer A pouch cell was prepared in substantially the same manner as in Example 1, except that the thickness of the second ceramic coating layer was changed to be 40% of the thickness of the positive active material layer disposed on the second surface in the positive electrode.

Example 3: Thickness of First Ceramic Coating Layer>Thickness of Second Ceramic Coating Layer A pouch cell was prepared in substantially the same manner as in Example 1, except that the thickness of the first ceramic coating layer was changed to be 40% of the thickness of the positive active material layer disposed on the first surface in the positive electrode.

Example 4: Particle Diameter of First Ceramic Coating Layer Particles>Particle Diameter of Second Ceramic Coating Layer Particles A pouch cell was prepared in substantially the same manner as in Example 1, except that the D50 particle diameter of the second ceramic particles included in the second ceramic coating layer was changed from 1.8 μm to 1.0 μm in the positive electrode.

Example 5: Type of First Ceramic Coating Layer Particles ≠Type of Second Ceramic Coating Layer Particles A pouch cell was prepared in substantially the same manner as in Example 1, except that the type of the second ceramic particles included in the second ceramic coating layer was changed from Boehmite to alumina in the positive electrode.

Comparative Example 1: Free from First and Second Ceramic Coating Layers

A pouch cell was prepared in substantially the same manner as in Example 1, except that the first ceramic coating layer and the second ceramic coating layer were not formed in the positive electrode.

Comparative Example 2: Forming First Ceramic Coating Layer without Second Ceramic Coating Layer A pouch cell was prepared in substantially the same manner as in Example 1, except that the second ceramic coating layer was not formed in the positive electrode.

Comparative Example 3: Forming Second Ceramic Coating Layer without First Ceramic Coating Layer A pouch cell was prepared in substantially the same manner as in Example 1, except that the first ceramic coating layer was not formed in the positive electrode.

Evaluation Example 1: Evaluation of Charging/Discharging Characteristics at Room Temperature The pouch cell lithium batteries prepared in Examples 1 to 5 and Comparative Examples 1 to 3 were charged with a constant current of 0.2 C rate at 25° C. until a voltage reached 4.4 V (vs. Li). Subsequently, the lithium batteries were discharged with a constant current of 0.1 C rate until the voltage reached 2.8 V (vs. Li) (1st cycle).

Then, the lithium batteries were charged with a constant current of 1.0 C rate at 25° C. until the voltage reached 4.4 V (vs. Li). Subsequently, the lithium batteries were discharged with a constant current of 1.0 C rate until the voltage reached 3.0 V (vs. Li). This charging/discharging cycle was repeated 300 times.

However, at the 51th, 101th, 151th, 201th, and 251th cycles, the lithium batteries were charged with a constant current of 0.2 C rate at 25° C. until the voltage reached 4.4 V (vs. Li) and discharged with a constant current of 0.2 C rate until the voltage reached 2.8 V (vs. Li).

The lithium batteries were rested for 10 minutes after every charging/discharging cycle. Some room temperature charging/discharging test results are shown in Table 1. A capacity retention ratio at the 300th cycle is defined by Equation 1.

$$\text{Capacity retention ratio [\%]} = \qquad\qquad\text{Equation 1}$$
$$[\text{Discharge capacity at } 300^{th} \text{ cycle/}$$
$$\text{Designed disharge capacity}] \times 100$$

TABLE 1

| | Capacity retention ratio [%] |
|---|---|
| Example 1 | 85.6 |
| Comparative Example 1 | 85.3 |
| Comparative Example 2 | 85.4 |

As shown in Table 1, the presence or absence of the first ceramic coating layer and the second ceramic coating layer had no significant effect on room temperature charging/discharging characteristics.

Evaluation Example 2: Evaluation of Charging/Discharging Characteristics at High Temperature The pouch cell lithium batteries prepared in Examples 1 to 5 and Comparative Examples 1 to 3 were charged with a constant current of 0.2 C rate at 45° C. until a voltage reached 4.4 V (vs. Li). Subsequently, the lithium batteries were discharged with a constant current of 0.1 C rate until the voltage reached 2.8 V (vs. Li) (1$^{st}$ cycle).

Then, the lithium batteries were charged with a constant current of 1.0 C rate at 25° C. until the voltage reached 4.4

V (vs. Li). Subsequently, the lithium batteries were discharged with a constant current of 1.0 C rate until the voltage reached 3.0 V (vs. Li). This charging/discharging cycle was repeated 300 times.

However, at the 51th, 101th, 151th, 201th, and 251th cycles, the lithium batteries were charged with a constant current of 0.2 C rate at 45° C. until the voltage reached 4.2 V (vs. Li) and discharged with a constant current of 0.2 C rate until the voltage reached 2.8 V (vs. Li).

The lithium batteries were rested for 10 minutes after every charging/discharging cycle. Some high-temperature charging/discharging test results are shown in Table 1. A capacity retention ratio at the 300th cycle is defined by Equation 1.

$$\text{Capacity retention ratio [\%]} = \qquad\qquad\text{Equation 1}$$
$$[\text{Discharge capacity at } 300^{th} \text{ cycle/}$$
$$\text{Designed disharge capacity}] \times 100$$

TABLE 2

| | Capacity retention ratio [%] |
|---|---|
| Example 1 | 87.6 |
| Comparative Example 1 | 87.6 |
| Comparative Example 2 | 87.6 |

As shown in Table 2, the presence or absence of the first ceramic coating layer and the second ceramic coating layer had no significant effect on high-temperature charging/discharging characteristics.

Evaluation Example 3: Evaluation of Safety

Three samples were prepared from each of the pouch cell lithium batteries prepared in Examples 1 to 5 and Comparative Examples 1 to 3 and bent at 90° in the longitudinal direction to prepare lithium batteries in a bent state.

Three samples were prepared from each of the pouch cell lithium batteries prepared in Examples 1 to 5 and Comparative Examples 1 to 3 and charged with a constant current of 0.2 C rate at 25° C. until a voltage reached 4.4 V (vs. Li).

The charged lithium batteries were placed on a V-shaped SUS jig in an explosion proof chamber and the center of each lithium battery was pressed using a triangular jig to bend the lithium battery at 90° in the longitudinal direction.

Subsequently, the bent lithium battery was turned over and pressed at the upper portion using the jig to prepare a flat lithium battery in an unfolded state. Moving speeds of the jig during the bending and unfolding were 1 mm/sec, respectively.

The bent and unfolded lithium batteries were charged with a constant current of 1.0 C rate at 25° C. until the voltage reached 4.2 V (vs. Li) and discharged with a constant current of 1.0 C rate until the voltage reached 2.8 V (vs. Li). While repeating this cycle, ignition was evaluated. A case in which no flame occurred was determined as OK, and a case in which a flame occurred was determined as NG.

Evaluation results are shown in Table 3 below.

TABLE 3

| | Ratio of ignited battery in bent state | Ratio of ignited battery in unfolded state |
|---|---|---|
| Example 1 | 0/3 | 0/3 |
| Example 2 | 0/3 | 0/3 |
| Example 3 | 0/3 | 0/3 |
| Example 4 | 0/3 | 0/3 |
| Example 5 | 0/3 | 0/3 |
| Comparative Example 1 | 3/3 | — |
| Comparative Example 2 | 0/3 | 3/3 |
| Comparative Example 3 | 0/3 | 2/3 |

As shown in Table 3, the lithium batteries of Examples 1 to 5 had improved safety compared to the lithium batteries of Comparative Examples 1 to 3 because short circuits are prevented or reduced in the lithium batteries of Examples 1 to 5.

According to an aspect of one or more embodiments of the present disclosure, short circuits are prevented or reduced in the electrode assembly in which the insulating layers are introduced onto both surfaces of the positive electrode uncoated portion, and thus structural safety of secondary batteries including the electrode assembly may be improved.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As used herein, the term "substantially," "about," and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within +30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Further, the use of "may" when describing embodiments of the present disclosure refers to "one or more embodiments of the present disclosure."

The portable device, vehicle, and/or the battery, e.g., a battery controller, and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that one or more suitable modifications and changes in form and details may be made therein without departing from the spirit and scope of the disclosure as defined by the following claims and equivalents thereof.

What is claimed is:

1. An electrode assembly accommodated in an exterior material, the electrode assembly comprising:

a positive electrode, the positive electrode comprising a positive electrode substrate and a positive active material layer on both sides of the positive electrode substrate;

a negative electrode; and a separator between the positive electrode and the negative electrode, wherein the positive electrode is in an outermost area of the electrode assembly, the positive electrode substrate comprises a first surface and a second surface opposite to the first surface, the first surface comprises a first coated portion on which the positive active material layer is located and a first uncoated portion free from the positive active material layer, the second surface has a second coated portion on which the positive active material layer is located and a second uncoated portion free from the positive active material layer, a first ceramic coating layer is on the first uncoated portion, and a second ceramic coating layer is on the second uncoated portion, and the first ceramic coating layer directly faces the exterior material and is on an outermost surface of the electrode assembly; and at the outermost area of the electrode assembly, the first uncoated portion comprises a first curved portion and a first straight portion and the first ceramic coating layer is directly on the first uncoated portion at both the first curved portion and the first straight portion.

2. The electrode assembly of claim 1, wherein the positive electrode, the separator, and the negative electrode are wound in a jelly-roll form.

3. The electrode assembly of claim 1, wherein the first uncoated portion and the second uncoated portion each independently comprise curved portions and straight portions alternately arranged, the second uncoated portion comprises: a second curved portion opposite to the first curved portion; and a second straight portion opposite to the first straight portion, and the second ceramic coating layer is on the second curved portion and the second straight portion.

4. The electrode assembly of claim 3, wherein a length of the first ceramic coating layer is greater than a length of the second ceramic coating layer, and the first uncoated portion further comprises a third curved portion and a third straight portion, and the first ceramic coating layer is on the third curved portion and the third straight portion.

5. The electrode assembly of claim 4, wherein the first uncoated portion further comprises a fifth curved portion extending from the third straight portion, and the first uncoated portion comprises the first curved portion and the fifth curved portion, the fifth curved portion is adjacent to an inner side of the first curved portion, and the negative electrode is absent between the first curved portion and the fifth curved portion.

6. An electrode assembly accommodated in an exterior material, the electrode assembly comprising:

a positive electrode, the positive electrode comprising a positive electrode substrate and a positive active material layer on both sides of the positive electrode substrate;

a negative electrode; and a separator between the positive electrode and the negative electrode, wherein the positive electrode is in an outermost area of the electrode assembly, the positive electrode substrate comprises a first surface and a second surface opposite to the first surface, the first surface comprises a first coated portion on which the positive active material layer is located and a first uncoated portion free from the positive active material layer, the second surface has a second coated portion on which the positive active material layer is located and a second uncoated portion free from the positive active material layer, a first ceramic coating layer is on the first uncoated portion, and a second ceramic coating layer is on the second uncoated portion, the first ceramic coating layer directly faces the exterior material, and thicknesses of the first ceramic coating layer and the second ceramic coating layer are each from about 20% to about 90% of a thickness of the positive active material layer.

7. The electrode assembly of claim 1, wherein the first ceramic coating layer is in contact with a side surface of the positive active material layer without being in contact with a top surface of the positive active material layer.

8. The electrode assembly of claim 7, wherein a thickness of the first ceramic coating layer is different from a thickness of the second ceramic coating layer.

9. The electrode assembly of claim 1, wherein a thermal conductivity of the first ceramic coating layer is different from a thermal conductivity of the second ceramic coating layer.

10. The electrode assembly of claim 1, wherein the first ceramic coating layer comprises first ceramic particles, and the second ceramic coating layer comprises second ceramic particles, and the first ceramic particles and the second ceramic particles each independently comprise particles of $SiO_2$, Boehmite, $BaTiO_3$, $Pb(Zr, Ti)O_3$ (PZT), $Pb_{1-x}La_xZr_{1-y}Ti_yO_3$ (PLZT, where $0<x<1$ and $0<y<1$), $Pb(Mg_{1/3}Nb_{2/3})O_3$—$PbTiO_3$(PMN-PT), $HfO_2$, $SrTiO_3$, $SnO_2$, $CeO_2$, $MgO$, $NiO$, $CaO$, $ZnO$, $ZrO_2$, $Y_2O_3$, $Al_2O_3$, $SiC$, $TiO_2$, $PbO$, $Bi_2O_3$, $MoO_3$, $V_2O_5$, $Nb_2O_5$, $Ta_2O_5$, $WO_3$, $In_2O_3$, or any combination thereof.

11. The electrode assembly of claim 10, wherein particle diameters of the first ceramic particles are different from particle diameters of the second ceramic particles, or shapes of the first ceramic particles are different from shapes of the second ceramic particles.

12. The electrode assembly of claim 4, wherein the first uncoated portion further comprises: a fifth curved portion extending from the third straight portion and a fifth straight portion; and a seventh curved portion extending from the fifth straight portion and a seventh straight portion, the second uncoated portion further comprises a fourth curved portion extending from the second straight portion and a fourth straight portion, and a first organic insulating layer is on the seventh curved portion, and a second organic insulating layer is on the fourth curved portion.

13. The electrode assembly of claim 12, wherein the second organic insulating layer blocks contact between the second uncoated portion and a third uncoated portion of the negative electrode.

14. The electrode assembly of claim 12, wherein the second organic insulating layer comprises an insulating tape.

15. The electrode assembly of claim 14, wherein the insulating tape comprises an insulating polymer, and the insulating polymer comprises polytetrafluoroethylene (PTFE), polytetrafluoroethylene-ethylene (ETFE), polytetrafluoroethylene-perfluoroalkylvinyl ether (PFA), polyacrylate (PA), styrene-butadiene rubber (SBR), polyimide (PI), liquid crystalline polymer (LCP), polyphenylene sulfide (PPS), polybutylene terephthalate (PBT), polyethylene terephthalate (PET), polyethylene (PE), polypropylene (PP), polyvinyl chloride (PVC), polyvinylidene fluoride (PVdF), polyvinylidenefluoride-cohexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethylsucrose, pullulan, carboxyl methyl cellulose, or any combination thereof.

16. The electrode assembly of claim 1, wherein the first surface further comprises a fifth uncoated portion at a winding start portion and free from the positive active material layer, the second surface further comprises a sixth uncoated portion at the winding start portion and free from the positive active material layer, and an electrode tab is on the fifth uncoated portion or the sixth uncoated portion.

17. The electrode assembly of claim 16, further comprising a first protective tape on the electrode tab.

18. The electrode assembly of claim 12, wherein the negative electrode comprises:

a negative electrode substrate; and a negative active material layer on both sides of the negative electrode substrate, wherein the negative electrode substrate comprises a third surface and a fourth surface opposite to the third surface, the third surface comprises: a third coated portion on which the negative active material layer is located; and a third uncoated portion at a winding end portion and free from the negative active material layer, the fourth surface comprises: a fourth coated portion on which the negative active material layer is located; and a fourth uncoated portion at the winding end portion and free from the negative active material layer, and the third uncoated portion is adjacent to an inner side of the fourth curved portion of the positive electrode, and the third uncoated portion faces the fourth curved portion.

19. A secondary battery comprising:

the exterior material; and the electrode assembly of claim 1 accommodated in the exterior material.

20. The secondary battery of claim 19, wherein the outermost surface of the electrode assembly is in direct contact with the exterior material.

\* \* \* \* \*